(12) United States Patent
Hecht et al.

(10) Patent No.: US 11,333,237 B2
(45) Date of Patent: *May 17, 2022

(54) HANDHELD TOOL DEVICE

(71) Applicant: Robert Bosch GmbH, Stuttgart (DE)

(72) Inventors: Joachim Hecht, Magstadt (DE); Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

This patent is subject to a terminal disclaimer.

(21) Appl. No.: 16/928,896

(22) Filed: Jul. 14, 2020

(65) Prior Publication Data
US 2020/0340572 A1    Oct. 29, 2020

Related U.S. Application Data

(63) Continuation of application No. 14/968,448, filed on Dec. 14, 2015, now Pat. No. 10,746,277.

(30) Foreign Application Priority Data

Dec. 15, 2014 (DE) ..................... 10 2014 225 903.7

(51) Int. Cl.
*B25F 5/00* (2006.01)
*B25F 5/02* (2006.01)
*F16H 57/025* (2012.01)

(52) U.S. Cl.
CPC ........... *F16H 57/025* (2013.01); *B25F 5/001* (2013.01); *B25F 5/02* (2013.01)

(58) Field of Classification Search
CPC ........... F16H 57/025; B25F 5/001; B25F 5/02
See application file for complete search history.

(56) References Cited

U.S. PATENT DOCUMENTS

| | | | | |
|---|---|---|---|---|
| 1,764,950 A | * | 6/1930 | Griner | A47G 27/0418 24/575.1 |
| 2,034,559 A | * | 3/1936 | Brunner | F16B 2/241 411/520 |
| 2,236,130 A | * | 3/1941 | Betebenner | F16B 2/08 285/154.3 |
| 2,284,222 A | * | 5/1942 | Miller | F16L 37/008 29/453 |
| 3,340,760 A | * | 9/1967 | Wormser | F16B 21/186 411/520 |
| 3,450,234 A | * | 6/1969 | Takata | F16D 65/095 188/73.31 |
| 4,464,836 A | * | 8/1984 | Hissa | B23D 51/14 16/442 |

(Continued)

FOREIGN PATENT DOCUMENTS

| | | |
|---|---|---|
| CN | 201388660 Y | 1/2010 |
| CN | 102950586 A | 3/2013 |

(Continued)

*Primary Examiner* — Thomas M Wittenschlaeger
*Assistant Examiner* — Katie L Gerth
(74) *Attorney, Agent, or Firm* — Norton Rose Fulbright US LLP; Gerard Messina

(57) ABSTRACT

A handheld tool device having at least one first gear housing, having at least one second gear housing, and having a bracket holder unit provided for connecting the two gear housings. It is provided that in the assembled state the bracket holder unit is situated at least in an area of contact of the gear housings in an opening of at least one of the gear housings.

18 Claims, 7 Drawing Sheets

(56) References Cited

U.S. PATENT DOCUMENTS

| | | | | |
|---|---|---|---|---|
| 4,735,534 A | * | 4/1988 | Oehlke | B60Q 1/0683 |
| | | | | 174/153 G |
| 5,127,764 A | * | 7/1992 | Baer | F16B 21/186 |
| | | | | 403/316 |
| D370,604 S | * | 6/1996 | Donabedian | D8/14 |
| 6,305,870 B1 | * | 10/2001 | Mita | F16B 21/16 |
| | | | | 403/254 |
| 6,446,734 B1 | * | 9/2002 | Williams | B25F 5/02 |
| | | | | 173/1 |
| 6,672,402 B2 | | 1/2004 | Ortt et al. | |
| 7,980,324 B2 | | 7/2011 | Bixler et al. | |
| 8,713,806 B2 | * | 5/2014 | Tokunaga | B23D 47/12 |
| | | | | 30/388 |
| 8,760,102 B2 | * | 6/2014 | Hirabayashi | B25B 21/02 |
| | | | | 318/546 |
| 9,097,331 B2 | * | 8/2015 | Saur | F16H 57/08 |
| 9,109,670 B2 | * | 8/2015 | Roehm | F16H 3/62 |
| 9,168,651 B2 | * | 10/2015 | Hecht | F16D 43/206 |
| 9,776,316 B2 | * | 10/2017 | Hecht | B23B 45/00 |
| 2001/0026051 A1 | | 10/2001 | Gifford et al. | |
| 2007/0201748 A1 | * | 8/2007 | Bixler | B25F 5/02 |
| | | | | 382/225 |
| 2008/0224483 A1 | * | 9/2008 | Haberlein | B25F 5/02 |
| | | | | 292/258 |
| 2010/0132497 A1 | * | 6/2010 | Hecht | B25F 5/001 |
| | | | | 74/473.3 |
| 2011/0180289 A1 | * | 7/2011 | Kumagai | B25F 5/02 |
| | | | | 173/90 |
| 2012/0090863 A1 | * | 4/2012 | Puzio | B25B 21/02 |
| | | | | 173/2 |
| 2013/0025900 A1 | * | 1/2013 | Kokinelis | B25F 5/02 |
| | | | | 173/216 |
| 2013/0047762 A1 | * | 2/2013 | Hecht | B25F 5/001 |
| | | | | 74/333 |
| 2013/0062498 A1 | * | 3/2013 | Ito | B25F 5/02 |
| | | | | 248/672 |
| 2013/0175066 A1 | * | 7/2013 | Zhang | B25B 21/00 |
| | | | | 173/47 |
| 2014/0034347 A1 | * | 2/2014 | Lam | B25F 5/00 |
| | | | | 173/180 |
| 2014/0051539 A1 | | 2/2014 | Roehm et al. | |
| 2014/0130627 A1 | * | 5/2014 | Hampel | F16H 1/203 |
| | | | | 74/385 |
| 2014/0274548 A1 | * | 9/2014 | Kelleher | F16D 7/00 |
| | | | | 475/293 |
| 2015/0114675 A1 | * | 4/2015 | Kraus | B25F 5/00 |
| | | | | 173/178 |
| 2016/0169365 A1 | * | 6/2016 | Hecht | F16H 57/025 |
| | | | | 173/216 |

FOREIGN PATENT DOCUMENTS

| | | |
|---|---|---|
| CN | 203258140 U | 10/2013 |
| DE | 19729988 C1 | 8/1998 |
| EP | 0176210 A2 | 4/1986 |
| JP | 2009072032 A | 4/2009 |

* cited by examiner

HANDHELD TOOL DEVICE

RELATED APPLICATION INFORMATION

The present application is a continuation of, and claims the benefit under 35 U.S.C. § 120 to, U.S. patent application Ser. No. 14/968,448 filed on Dec. 14, 2015, which is expressly incorporated herein by reference in its entirety. The present application also claims priority to and the benefit of German patent application no. 10 2014 225 903.7, which was filed in Germany on Dec. 15, 2014, the disclosure of which is incorporated herein by reference.

FIELD OF THE INVENTION

The present invention relates to a handheld device.

BACKGROUND INFORMATION

Handheld machine tools are known that have at least two gear housings, the housings being connected to one another by a screw connection, a locking connection, or a bracket holder unit.

SUMMARY OF THE INVENTION

The present invention is based on a handheld tool device having at least one first gear housing, having at least one second gear housing, and having a bracket holder unit that is provided for the detachable connection of the two gear housings.

It is proposed that, in the assembled state, the bracket holder unit is situated at least in a contact region of the gear housing, in an opening of at least one of the gear housings.

In the present context, a "handheld tool device" is to be understood in particular as at least a part, in particular a sub-assembly, of a handheld machine tool. In particular, the handheld tool device can also include the overall handheld machine tool. The handheld machine tool can in particular be fashioned as an arbitrary handheld machine tool considered useful by someone skilled in the art, which may be an electric handheld machine tool, such as a drilling machine, a drilling and/or impact hammer, a battery-operated drill, a battery-operated screwdriver, and/or a battery-operated drill/screwdriver.

In particular, the handheld tool device includes a gear housing unit that is provided in particular to accommodate and/or enclose, in an assembled state, at least one, advantageously exactly one, gear unit at least partially, advantageously at least in large part, and particularly completely. Here, the gear housing unit has in particular at least two gear housings, advantageously the first gear housing and the second gear housing, and is particularly formed by the first gear housing and the second gear housing. An outer contour of the gear housing unit and/or of the gear housing is advantageously fashioned at least substantially cylindrically, in particular in a circular cylindrical shape. The expression "at least in large part" is intended to be understood as covering in particular at least 51%, advantageously at least 60%, which may be at least 70%, and particularly at least 85%. An "at least substantially cylindrical" object is to be understood in particular as an object that deviates from a cylindrical object with a volume portion of a maximum of 30%, advantageously a maximum of 20%, and particularly a maximum of 10%. "Provided" is to be understood in particular as specifically designed and/or equipped. The statement that an object is provided for a particular function is to be understood in particular as meaning that this object fulfills and/or carries out this particular function in at least one state of use and/or operational state.

In addition, a "bracket holder unit" is to be understood in particular as a holding unit, which may be at least partly elastic, that has at least one holding element, in particular bracket-shaped, and is provided in particular to connect the first gear housing and the second gear housing to one another with a nonpositive fit and/or with a positive fit, and which may be detachably. The at least one holding element can have an arbitrary shape and/or contour considered useful by a person skilled in the art. Advantageously, the at least one holding element, in particular regarded in a side view, but at least substantially, is C-shaped, V-shaped, and/or U-shaped, and in particular has at least two, advantageously exactly two, bending edges, and in particular has at least two holding arms, and advantageously has at least one connecting web. Advantageously, the at least two holding arms and the at least one connecting web enclose an angle, in particular an acute angle, of at least 60° and a maximum of 90°, which may be less than 90°. Particularly, the bracket holder unit, in particular the at least one holding element, may be fashioned as a transport securing device. In this connection, a "partially elastic object" is to be understood in particular as an object, in particular a resetting object, that has at least a partial area that, in a normal operating state, can be elastically modified in its position by at least 0.1 mm, which may be by at least 0.5 mm, in particular may be by at least 1 mm, and that produces in particular a counter-force that is a function of a change of the position and may be proportional to the change, and which in particular counteracts the change. In particular, the elastic object is repeatedly deformable, in particular at least ten times and in particular without being damaged, and in particular automatically seeks to return to a basic shape after a deformation. In addition, a "detachable connection" between two objects is to be understood in particular as a connection that can be produced and/or separated reversibly without damage, in particular arbitrarily many times, which may be while avoiding damage to the objects. In addition, a "transport securing device" is to be understood in particular as a unit that is provided to connect the gear housings securely to one another at least during a transport, and that is advantageously provided to absorb, at least in large part, forces that occur during the transport. Advantageously, during operation axial forces occurring inside the gear housing, in particular coupling forces, are absorbed at least in large part, and which may be completely, by components differing from the bracket holder unit. In particular, the bracket holder unit is used at least substantially exclusively for securing the connection of the two gear housings during the transport. The bracket unit and/or the at least one holding element can in addition be made at least partly, which may be at least in large part, and particularly completely, of an arbitrary material considered useful by a person skilled in the art, such as plastic, rubber, and/or advantageously steel, in particular hardened steel, high-grade steel, and/or particularly spring steel.

In addition, an "opening" is to be understood in particular as a recess and/or material opening that in particular is situated on an outer side of the at least one gear housing, which may be in an edge area of the at least one gear housing, and in particular is provided to accommodate, at least partly, the bracket unit, in particular the at least one holding element. Advantageously, the opening extends up to an outermost, in particular radial and/or axial, point of the at least one gear housing. Particularly, the first gear housing and the second gear housing may have an opening, in particular in the contact area of the gear housings. A "contact area" of two objects is to be understood, in this context, in particular as an area of proximity around at least one point of contact of the objects. In addition, an "area of proximity" is to be understood in particular as a spatial region that is formed from points that each have a distance of at most 20 mm, advantageously at most 10 mm, which may be at most 5 mm, and particularly at most 0.5 mm from a reference point and/or reference component.

In addition, the handheld tool device can have at least one handheld tool housing, at least one drive module, advantageously an electric motor, at least one, advantageously exactly one, gear unit, and/or at least one tool receptacle. The gear unit is advantageously fashioned as a multi-speed planetary gear, and in particular is situated, in an assembled state, at least partly, which may be at least in large part, and particularly completely inside the gear housing unit.

Through a corresponding design of the handheld tool device, in particular efficiency can be improved, in particular constructive space efficiency, cost efficiency, weight efficiency, and/or time efficiency, in particular during assembly. In addition, in particular a connection between the gear housings can be achieved that is neutral with respect to constructive space and is advantageously detachable, whereby in particular maintenance, assembly, and/or exchange of components can be facilitated.

Advantageously, the bracket holder unit and/or the at least one holding element is situated at least partially and may be at least in large part in a radial opening in at least one of the gear housings. In this context, a "radial opening" is to be understood in particular as an opening that extends in a radial direction, in particular in relation to the gear housing unit, to at least one of the gear housings, and/or to a tool axis of rotation of the handheld tool device. Particularly, the at least two gear housings each may have a radial opening in which the bracket holder unit and/or the at least one holding element is situated at least partially and may be at least in large part. In this way, in particular a bracket holder unit can be provided that is neutral with respect to constructive space.

If the bracket holder unit and/or the at least one holding element is situated at least partly, and may be at least in large part, in an axial opening of at least one of the gear housings, in particular a simple assembly can be achieved. In the present context, an "axial opening" is to be understood in particular as an opening that extends in an axial direction, in particular relative to the gear housing unit, to at least one of the gear housings and/or to the tool axis of rotation of the handheld tool device. Particularly, the at least two gear housings each may have an axial opening in which the bracket holder unit and/or the at least one holding element is situated at least partially and may be at least in large part.

In addition, it is proposed that the bracket holder unit and/or the at least one holding element is provided to exert an axial holding force on the at least two gear housings, and in particular, in an assembled state, on the at least two gear housings. In this way, in particular a secure connection can be ensured between the gear housings.

An assembly and/or disassembly that is particularly efficient with respect to time can be achieved in particular if the bracket holder unit, in particular the at least one holding element, is provided for a tangential assembly and/or disassembly. In the present context, a "tangential direction" is to be understood in particular as a direction that is oriented perpendicular to the axial direction and/or to the radial direction.

In an embodiment of the present invention, it is proposed that the bracket holder unit and/or the at least one holding element is situated at least partly, and may be at least in large part, in a bulge region of at least one of the gear housings. In the present context, a "bulge region" is to be understood in particular as a region of the gear housing that has a specific shape, and in particular that forms a bulge. In particular, the bulge region corresponds to a region having a larger radial extension compared to a surrounding area. In particular, the bulge region, and/or the bulge, is situated on an outer side of the gear housing, and extends at least partly, advantageously at least in large part, and particularly completely, in particular in annular fashion, around the at least one gear housing. Particularly, the at least two gear housings each may have a bulge region in which the bracket holder unit and/or the at least one holding element is situated at least partially and may be at least in large part. In this way, in particular a stability of the connection can be increased.

The bulge region, in particular the bulge, may be provided for an axial fixing of the gear housing, in particular having the bulge region, in particular inside the handheld tool housing. In this way, in particular additional fastening arrangements can be omitted, which can reduce costs.

In addition, a handheld tool device is proposed having at least a first gear housing, having at least a second gear housing, and having a bracket holder unit that is provided for connecting the two gear housings, the bracket holder unit having, in particular in an assembled state, an axial extension less than 30 mm, which may be less than 20 mm, particularly less than 10 mm. Advantageously, the at least one holding element has a longitudinal extension and/or, in particular in an assembled state, an axial extension less than 30 mm, which may be less than 20 mm, particularly less than 10 mm. In this way, a required constructive space can advantageously be reduced.

In an embodiment of the present invention, it is proposed that at least one of the gear housings has a ring gear bearing region in whose axial segment the bracket holder unit and/or the at least one holding element is situated, at least partially and which may be at least in large part. In particular, there exists at least one plane, advantageously a plurality of planes disposed parallel to one another, that is disposed in particular perpendicular to a longitudinal extension of the gear housing unit and/or of the tool axis of rotation, and which in particular contains at least one point of the ring gear bearing region and at least one point of the bracket holder unit. An object being situated in an "axial segment" of another object is to be understood in particular as meaning that the two objects are disposed so as to overlap axially. A "ring gear bearing region" is to be understood in the present context in particular as a region in which, in an assembled state, there is situated at least one, which may be exactly one, ring gear, in particular of the gear unit. In this way, in particular a simple and advantageously time-efficient assembly can be achieved.

In addition, it is provided that the ring gear bearing region is provided to accommodate a ring gear of a gear shift and/or to accommodate a ring gear of a torque coupling. In this way, in particular an advantageously compact design can be achieved.

If at least one of the gear housings has a securing bearing region in whose axial segment the bracket holder unit and/or the at least one holding element is situated at least partially, and may be at least in large part, an assembly can be further simplified. In particular, there exists at least one plane, advantageously a plurality of planes disposed in parallel, disposed in particular perpendicular to a longitudinal extension of the gear housing unit and/or of the tool axis of rotation, and which in particular contains at least one point of the securing bearing region and at least one point of the bracket holding unit. In the present context, a "securing bearing region" is to be understood in particular as a region in which, in an assembled state, there is situated at least one securing element, advantageously a securing ring and/or a securing plate. The at least one securing element is here in particular provided to secure and/or to fix components situated in at least one of the gear housings, in particular in the axial direction, in particular in a partially assembled state of the handheld tool device, whereby the gear housings can in particular be pre-assembled separately.

In addition, it is proposed that at least one of the gear housings has a bearing region of a locking element for a housing-fixed locking of a gear shift element, advantageously at least of the ring gear of the gear shift, the bracket holder unit and/or the at least one holding element being situated at least partially, and may be at least in large part, in the axial segment of the bearing region. In this way, in particular forces that occur during a gear shifting process can advantageously be absorbed by the bracket holder unit, and forces acting on other components of the handheld tool device can in this way be minimized.

In addition, a handheld tool device is proposed having at least one first gear housing, having at least one second gear housing, having a bracket holder unit provided for connecting the two gear housings, and having a support unit that is provided to relieve stress on the bracket holder unit, in particular of the at least one holding element, by absorbing at least a force occurring during operation inside at least one of the gear housings, in particular the coupling force, at least in large part and may be completely. Advantageously, the supporting unit here has at least one supporting element that is fashioned in particular as a securing ring, as is disclosed in particular in DE 10 2011 081 661 A1. The expression "to relieve stress on the bracket holder unit" is to be understood in particular as meaning that, in the absence of the support unit, the bracket holder unit would absorb the occurring axial force, in particular coupling force, in particular at least in large part. In this way in particular forces acting on the bracket holder unit can be reduced, whereby the bracket holder unit, in particular the at least one holding element, can advantageously be relieved of stress. In addition, the bracket holder unit, in particular the at least one holding element, can be advantageously fashioned in space-saving fashion and/or with light weight.

A particularly compact design can be achieved in particular if at least one of the gear housings, and/or the gear housings, is/are provided to accommodate an at least two-speed planetary gear.

In a particular embodiment of the present invention, it is proposed that the bracket holder unit has at least two holding elements fashioned separately from one another, provided to exert an axial holding force on the gear housing. Advantageously, the holding elements are fashioned analogously to one another. In particular, the bracket holder unit can also have exactly one holding element and/or at least three and/or at least four holding elements. In this way, a stability of the connection can advantageously be increased, whereby a secure connection can be ensured.

In particular in an assembled state, the at least two holding elements can be configured with an angle relative to one another of at least 90°, advantageously at least 120°, and particularly at least 160°. However, advantageously in an assembled state the at least two holding elements are configured radially opposite one another, in particular with respect to the gear housing unit, to at least one of the gear housings, and/or to the tool axis of rotation. Advantageously, here the holding elements are situated in the same axial segment and/or at the same axial height, in particular relative to the gear housing unit, to at least one of the gear housings, and/or to the tool axis of rotation. In this way, a constructively simple handheld tool device can be provided.

The handheld tool device according to the present invention is not intended to be limited to the above-described use and specific embodiment. In particular, the handheld tool device according to the present invention can have, in order to fulfill a manner of functioning described herein, a number of individual elements, components, and units differing from a number named herein.

Further advantages result from the following description of the drawing. The drawing shows two exemplary embodiments of the present invention. The drawing, the description, and the claims contain numerous features in combination. A person skilled in the art will usefully also regard the features individually, and combine them to form useful further combinations.

DETAILED DESCRIPTION

Figure 1:
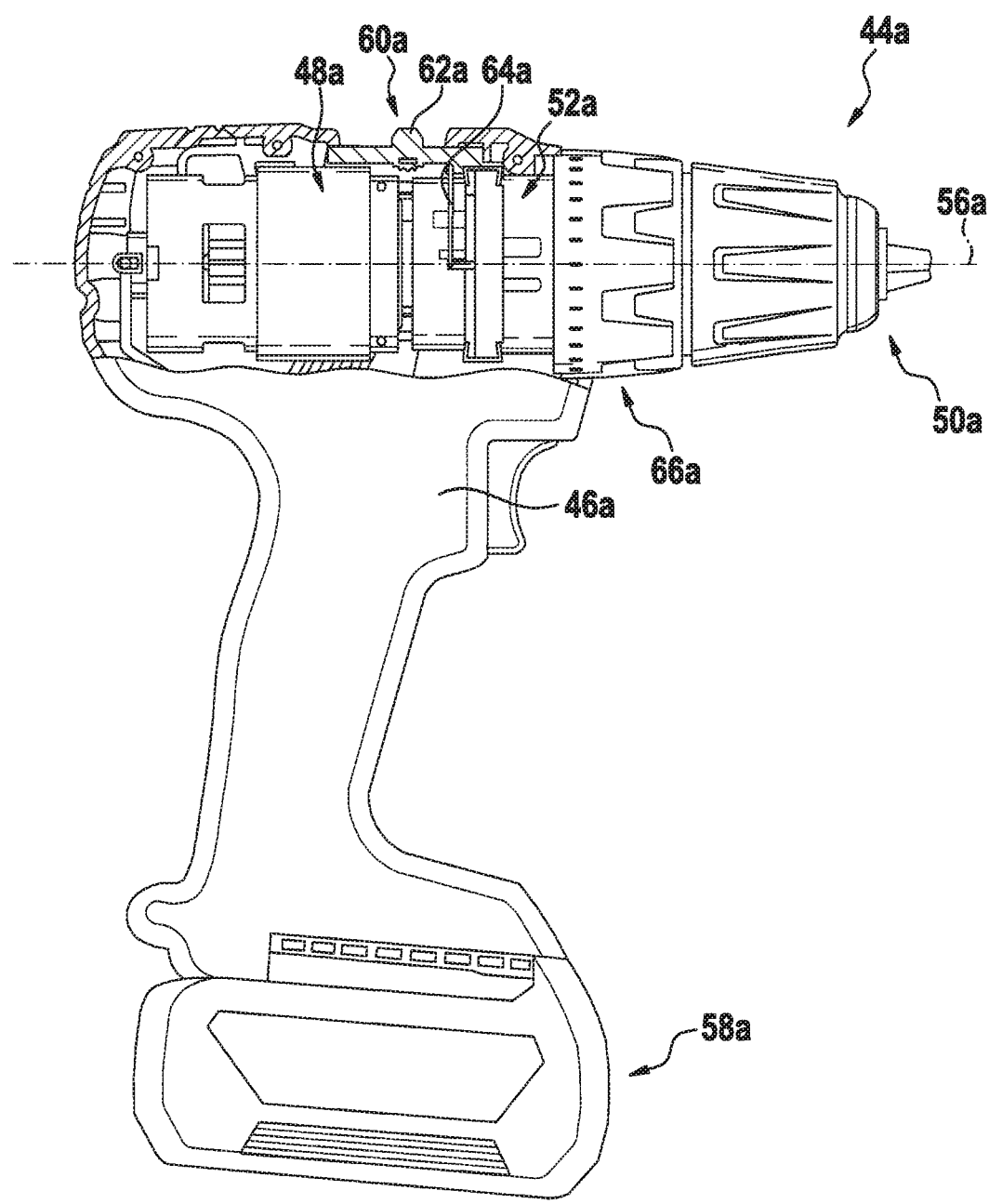
FIG. 1 shows a handheld machine tool fashioned as a battery-operated drill/screwdriver, having an at least partly removed handheld tool housing, and having a handheld tool device, in a perspective view.

FIG. 1 shows a cordless handheld machine tool 44a, fashioned as a battery-powered drill screwdriver, in a schematic view. Handheld machine tool 44a has a handheld tool device.

The handheld tool device has a handheld tool housing 46a. In the present case, handheld tool housing 46a has been at least partly removed, in particular in upper region of handheld machine tool 44a, for clarity.

The handheld tool device has a drive module 48a. Drive module 48a is realized as an electric drive motor. In addition, the handheld tool device has a tool receptacle 50a. Tool receptacle 50a is fashioned in the present case as a quick-release chuck. Tool receptacle 50a is fashioned to hold a tool (not shown) for drilling and/or screwdriving. In addition, the handheld tool device has a gear module 52a. Gear module 52a has an input shaft (not shown). The input shaft is connected to drive module 48a. In addition, gear module 52a has an output shaft 54a (cf. FIG. 3). Output shaft 54a is connected to tool receptacle 50a.

In addition, the handheld tool device has a tool axis of rotation 56a. Tool axis of rotation 56a defines an axial direction of the handheld tool device. A radial direction of the handheld tool device is, in the present case, oriented perpendicular to tool axis of rotation 56a. Drive module 48a, gear module 52a, and tool receptacle 50a are situated one after the other along tool axis of rotation 56a. Drive module 48a, gear module 52a, and tool receptacle 50a are provided to convert electrical energy of an accumulator 58a into a rotational movement of the tool. In the present case, the accumulator is fashioned as a lithium-ion accumulator. Alternatively, it is conceivable to use a nickel-cadmium accumulator, and/or a power pack.

In addition, the handheld tool device has a gear shifting unit 60a. Gear shifting unit 60a has an operating element 62a. Operating element 62a is made so as to be capable of sliding. Gear shifting unit 60a also has a connecting element 64a. Connecting element 64a connects operating element 62a to gear module 52a. Operating element 62a has at least two shift positions. Each shift position is allocated to a transmission speed. The transmission speeds define a rotational speed ratio between output shaft 54a and the input shaft.

In addition, the handheld tool device has an adjusting unit 66a for a torque. Adjusting unit 66a is supported and/or connected with gear module 52a by springs 102a, in particular pressure springs (cf. in particular FIG. 4). During operation, adjusting unit 66a and in particular springs 102a here bring about an axial force, in particular a coupling force, on gear module 52a.

Figure 2:
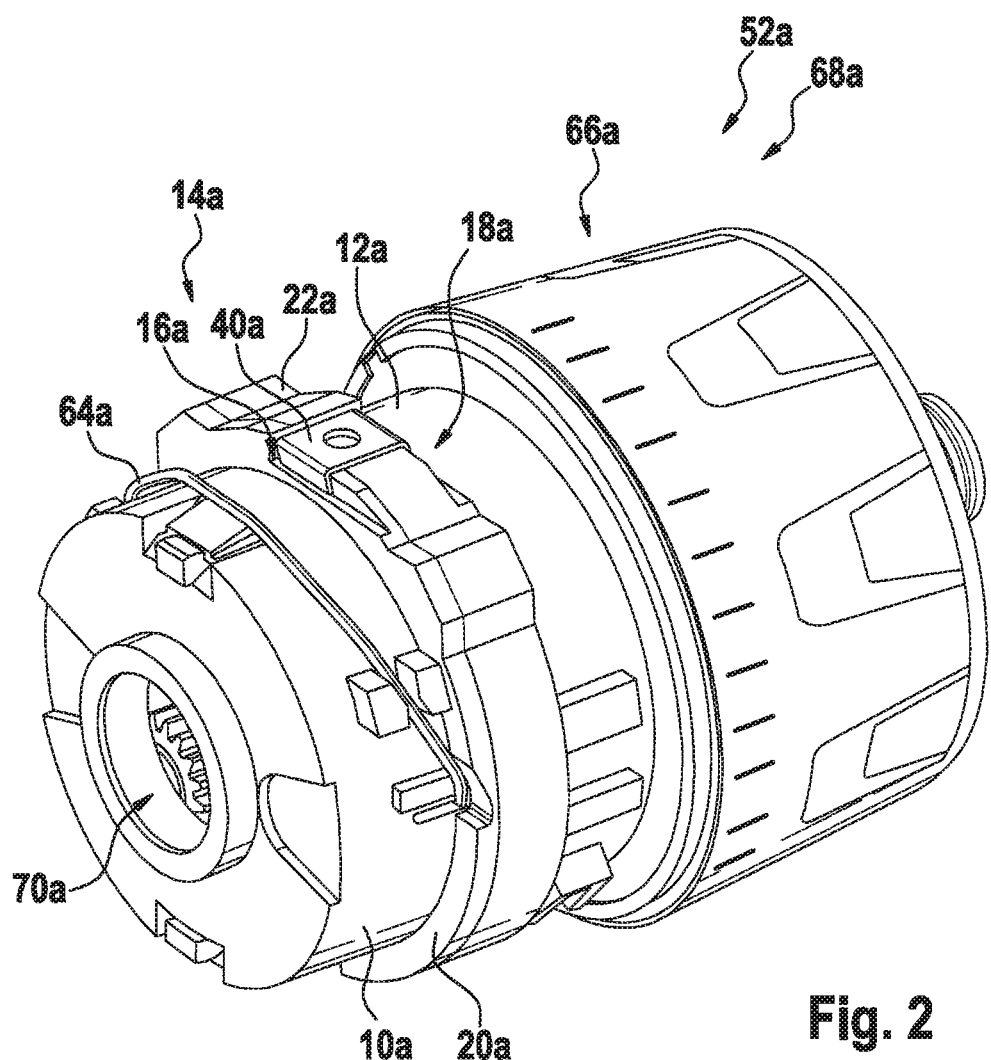
FIG. 2 shows a gear housing unit and a bracket holder unit of the handheld tool device, in a perspective view.
Figure 3:
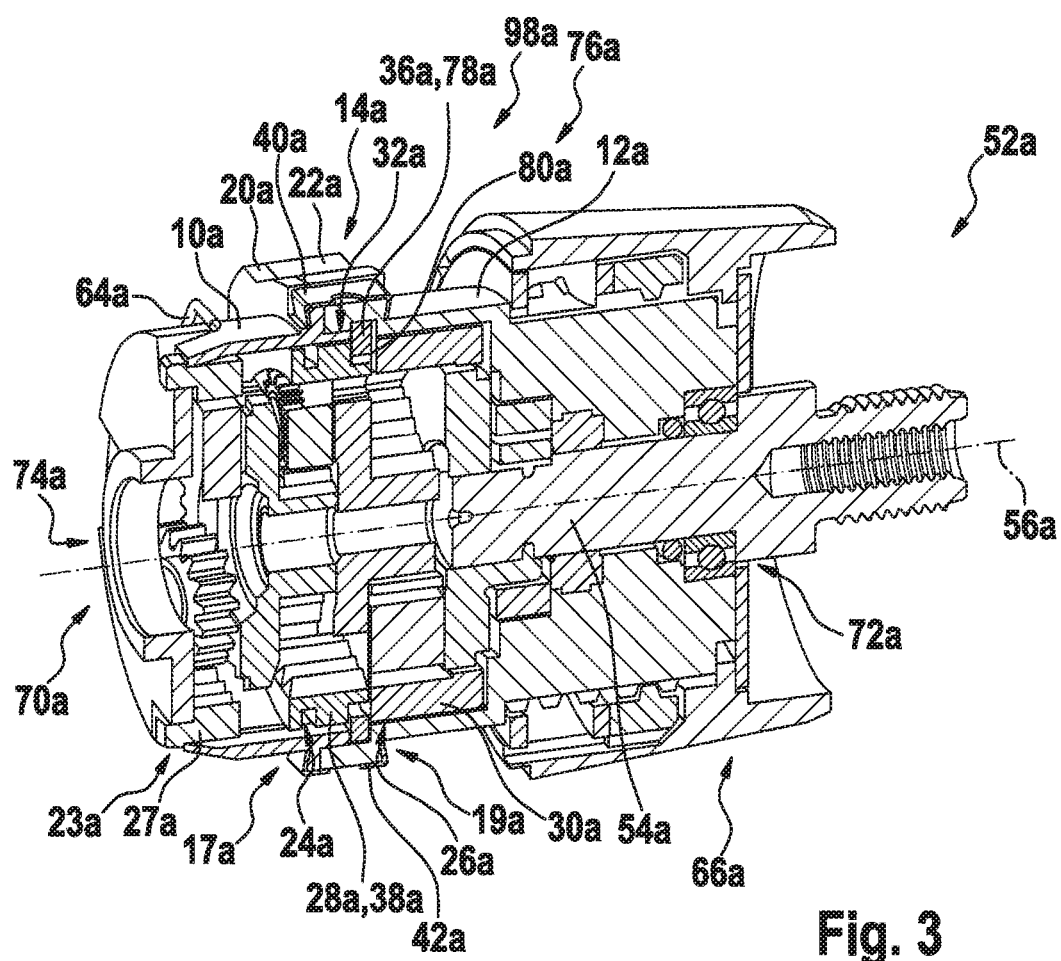
FIG. 3 shows a sectional view along a first axial direction of the gear housing unit.
Figure 4:
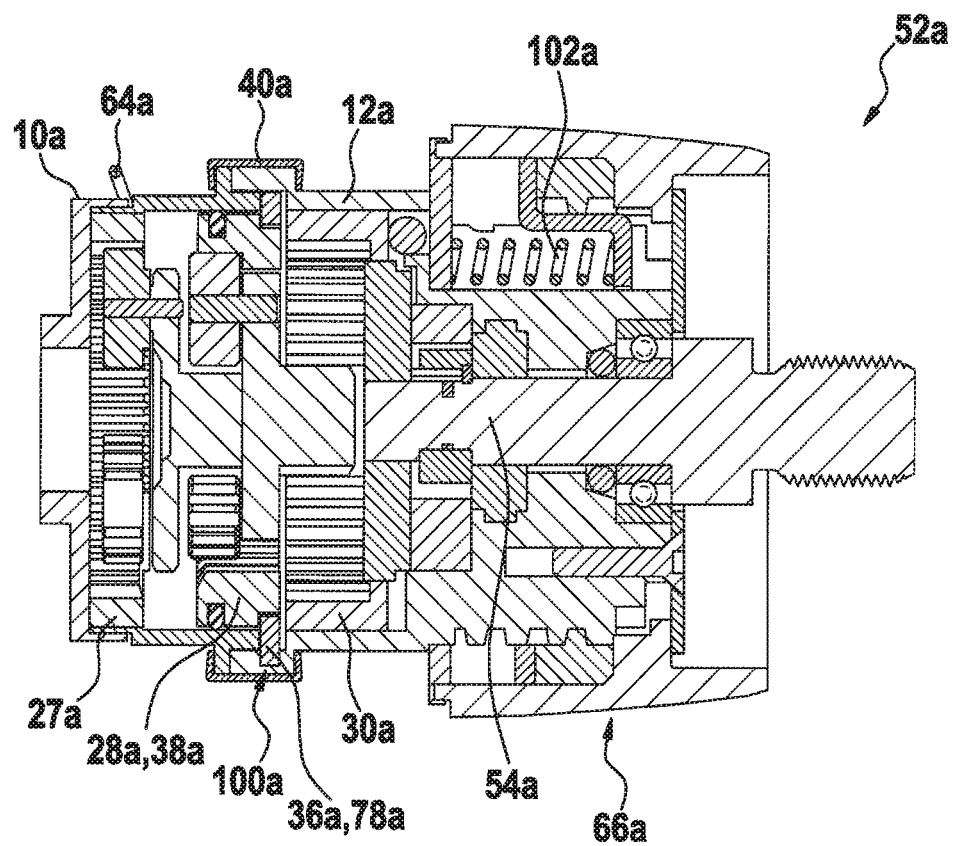
FIG. 4 shows a sectional view along a second axial direction of the gear housing unit.

FIGS. 2 through 4 show a design of gear module 52a. The handheld tool device has a gear housing unit 68a (cf. FIG. 2). Gear housing unit 68a is made up at least in large part of plastic. In the present case, gear housing unit 68a is made up at least in large part of nylon. A contour of gear housing unit 68a has an at least substantially circular cylindrical shape. Gear housing unit 68a has, in the present case, a first gear housing 10a and a second gear housing 12a. First gear housing 10a and second gear housing 12a form separate components.

In an assembled state, first gear housing 10a is situated on a side of gear module 52a facing drive module 48a. In an assembled state, first gear housing 10a is situated on a side of gear module 52a facing away from tool receptacle 50a.

A contour of first gear housing 10a has an at least substantially circular cylindrical shape. First gear housing 10a has an at least substantially hollow cylindrical shape. First gear housing 10a has a first opening 70a for the input shaft. In addition, first gear housing 10a has a guide region for connecting element 64a of gear shift unit 60a. Connecting element 64a is supported on first gear housing 10a. First gear housing 10a has a first bulge region 20a. First bulge region 20a is situated on an outer side of first gear housing 10a.

First bulge region 20a extends completely around first gear housing 10a, in particular in the circumferential direction. First bulge region 20a is raised relative to a surrounding area. First bulge region 20a is situated in an edge area of first gear housing 10a. First bulge region 20a is situated on a side of first gear housing 10a facing second gear housing 12a. First gear housing 10a has in addition a first radial opening. In addition, first gear housing 10a has a first axial opening. The first radial opening and the first axial opening form a common first opening 16a. First opening 16a is situated in an area of contact of first gear housing 10a with second gear housing 12a. In addition, first opening 16a is situated in first bulge region 20a. In addition, first gear housing 10a has a second opening 17a that is fashioned analogously to first opening 16a (cf. FIG. 3). First opening 16a and second opening 17a are situated radially opposite one another.

In an assembled state, second gear housing 12a is situated on a side of gear module 52a facing away from drive module 48a. In an assembled state, second gear housing 12a is situated on a side of gear module 52a facing tool receptacle 50a. A contour of second gear housing 12a has an at least substantially circular cylindrical shape. Second gear housing 12a has an at least substantially hollow cylindrical shape. Second gear housing 12a has a second opening 72a for output shaft 54a (cf. FIG. 3). In addition, second gear housing 12a is surrounded at least partly by adjusting unit 66a. Second gear housing 12a has a second bulge region 22a. Second bulge region 22a is situated on an outer side of second gear housing 12a. Second bulge region 22a extends completely around second gear housing 12a, in particular in the circumferential direction. Second bulge region 22a is raised relative to a surrounding area. Second bulge region 22a is situated in an edge area of second gear housing 12a. Second bulge region 22a is situated on a side of second gear housing 12a facing first gear housing 10a. In addition, second gear housing 12a has a third radial opening. In addition, second gear housing 12a has a third axial opening. The third radial opening and the third axial opening form a common third opening 18a. Third opening 18a is situated in an area of contact of second gear housing 12a with first gear housing 10a. In addition, third opening 18a is situated in second bulge region 22a. Third opening 18a is situated axially opposite first opening 16a, in particular in one of the bulge regions 20a, 22a. In addition, second gear housing 12a has a fourth opening 19a fashioned analogously to third opening 18a (cf. FIG. 3). Third opening 18a and fourth opening 19a are situated radially opposite one another. Fourth opening 19a is situated axially opposite second opening 17a, in particular in one of the bulge regions 20a, 22a.

Contact surfaces, bulge regions 20a, 22a, and openings 16a, 17a, 18a, and 19a of gear housings 10a, 12a are fashioned at least substantially analogously to one another. In an assembled state, first gear housing 10a is introduced concentrically into second gear housing 12a. Here, the contact surfaces and/or bulge regions 20a, 22a of gear housings 10a, 12a act as stops, and thus limit a depth of insertion of gear housings 10a, 12a into one another. In addition, stops and/or positive-fit elements can be provided in gear housings 10a, 12a, preventing rotation of gear housings 10a, 12a relative to one another. In addition, in an assembled state bulge regions 20a, 22a are provided for an axial fixing of gear housings 10a, 12a and/or of gear module 52a inside handheld tool housing 46a. Here it is conceivable that handheld tool housing 46a has at least one projection that is provided to grasp bulge regions 20a, 22a. Alternatively, it is conceivable that only one gear housing has a bulge region and/or an opening. In addition, a gear housing unit and/or gear housing can alternatively be made up at least partially, which may be at least in large part, and particularly completely of an arbitrary other material considered useful by a person skilled in the art, such as aluminum, and/or advantageously a plastic, in particular ABS.

The handheld tool device has in addition a gear unit 74a (cf. in particular FIG. 3). Gear unit 74a is fashioned as a three-speed planetary gear. Accordingly, gear unit 74a has three planetary gear speeds. The planetary gear speeds are configured one after the other along tool axis of rotation 56a. The planetary gear speeds are coupled to one another.

A first planetary gear speed is situated on a side of gear unit 74a facing first opening 70a and/or drive module 48a. The first planetary gear speed includes a first ring gear 27a. In an assembled state, first ring gear 27a is situated in a first ring gear bearing region 23a of first gear housing 10a. A second planetary gear speed is connected after the first planetary gear speed. The second planetary gear speed includes a second ring gear 28a. Second ring gear 28a corresponds to a ring gear 28a of a gear shift. In an assembled state, second ring gear 28a is situated in a second ring gear bearing region 24a of first gear housing 10a and/or of second gear housing 12a. Second ring gear 28a is connected to gear shift unit 60a by connecting element 64a. Second ring gear 28a is fashioned as a shift ring gear. Second ring gear 28a is provided to set a selected gear ratio. Accordingly, second ring gear 28a corresponds to gear shift element 38a. A third planetary gear speed is situated on a side of gear unit 74a facing second opening 72a and/or tool receptacle 50a. The third planetary gear speed is connected after the second planetary gear speed. The third planetary gear speed includes a third ring gear 30a. Third ring gear 30a corresponds to a ring gear 30 of a torque coupling. In an assembled state, third ring gear 30a is situated in a third ring gear bearing region 26a of second gear housing 12a. Third ring gear 30a is connected to adjusting unit 66a for the torque. Accordingly, ring gear bearing regions 24a, 26a are provided for accommodating ring gear 28a of the gear shift and for accommodating ring gear 30a of the torque coupling.

In addition, a securing unit 76a is situated between the second planetary gear speed and the third planetary gear speed. In an assembled state, securing unit 76a is situated in a securing bearing region 32a of second gear housing 12a. Securing unit 76a has a securing ring 78a. In addition, securing unit 76a has a securing plate 80a (cf. in particular FIG. 4). Securing ring 78a and securing plate 80a are provided to secure, in the axial direction, components situated in second gear housing 12a, in particular in a partly assembled state, whereby gear housings 10a, 12a can in particular be separately pre-assembled. For this purpose, securing ring 78a is connected to second gear housing 12a by a bayonet connection. In addition, securing ring 78a forms a locking element 36a for a housing-fixed locking of gear shift element 38a, in particular of second ring gear 28a. Here, gear shift element 38a, in particular second ring gear 28a, produces a force that acts on the locking element. Accordingly, securing bearing region 32a corresponds in the present case to a bearing region 34a of locking element 36a. Alternatively, however, it is also conceivable that a securing element, in particular a securing ring, and a locking element are different and/or separate components. In addition, a securing ring can be connected to a gear housing by a different fastening method considered useful by a person skilled in the art.

Figure 5:
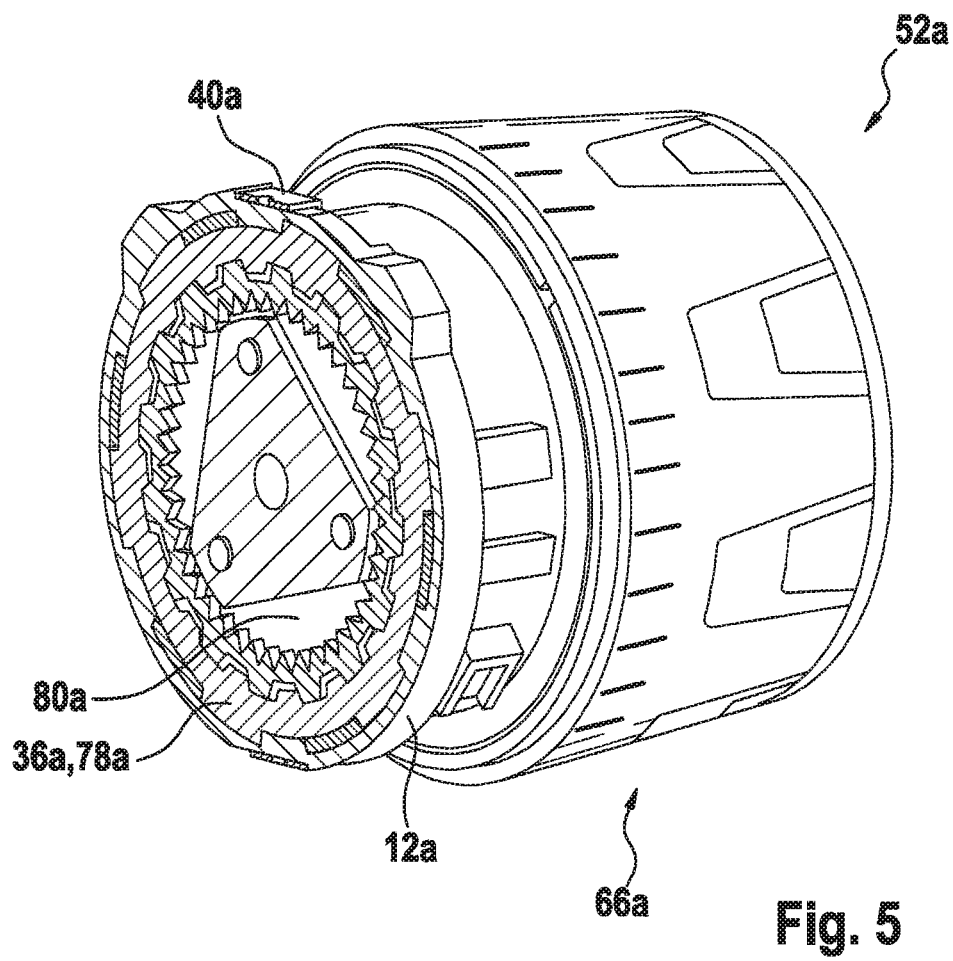
FIG. 5 shows a sectional view along a transverse direction of the gear housing unit.

In addition, the handheld tool device has a bracket unit 14a. Bracket unit 14a is provided to connect first gear housing 10a and second gear housing 12a to one another. In the present case, bracket unit 14a is fashioned as a transport securing unit. Accordingly, bracket unit 14a secures gear housings 10a, 12a at least during a transport. In addition, bracket holder unit 14a is provided to produce an axial holding force on gear housings 10a, 12a. For this purpose, bracket unit 14a has two holding elements 40a, 42a (cf. in particular also FIG. 5). Holding elements 40a, 42a are fashioned separately from one another. Holding elements 40a, 42a are fashioned analogously to one another. Holding elements 40a, 42a are made at least partially elastic. Holding elements 40a, 42a are fashioned in one piece. Holding elements 40a, 42a are made of a bent plate. Holding elements 40a, 42a are made of spring steel. Holding elements 40a, 42a have a material thickness of a maximum of 1.5 mm. In the present case, holding elements 40a, 42a have a material thickness of 0.8 mm. Holding elements 40a, 42a have a longitudinal extension and/or an axial extension of a maximum of 30 mm. In the present case, holding elements 40a, 42a have a longitudinal extension and/or axial extension of 10 mm. Holding elements 40a, 42a have a transverse extension of a maximum of 30 mm. In the present case, holding elements 40a, 42a have a transverse extension of 10 mm. Holding elements 40a, 42a are, regarded in a top view, at least substantially rectangular, in particular square. Alternatively, it is conceivable that holding elements are made oblong, regarded in a top view. In the present case, holding elements 40a, 42a, regarded in a side view, are at least substantially U-shaped. Here, each holding element 40a, 42a has two holding arms 82a, 84a, and a connecting web 86a. In the present case, holding arms 82a, 84a and connecting web 86a enclose an angle smaller than 90°. Holding elements 40a, 42a, and in particular holding arms 82a, 84a are provided in order to exert, in an assembled state, an axial holding force on gear housing 10a, 12a. For simple assembly and/or disassembly, each of the holding elements 40a, 42a, in particular connecting web 86a, additionally has a through-opening 88a.

In the present case, bracket holder unit 14a is provided for tangential assembly and disassembly. For assembly and/or disassembly, holding elements 40a, 42a are pressed in a tangential direction into openings 16a, 17a, 18a, 19a. In an assembled state, a first holding element 40a is situated in first opening 16a and in third opening 18a. In an assembled state, a second holding element 40a is situated in second opening 17a and in fourth opening 19a. Accordingly, in the assembled state holding elements 40a, 42a are situated radially opposite one another. In the assembled state, holding elements 40a, 42a, and in particular holding arms 82a, 84a press axially opposite walls of openings 16a, 17a, 18a, 19a against one another, and in this way in particular exert the holding force on gear housings 10a, 12a. Alternatively, however, it is also conceivable to fasten holding elements by an axial assembly and/or disassembly.

Accordingly, in the assembled state bracket holder unit 14a is situated in a contact region of gear housings 10a, 12a, in at least one opening 16a, 17a, 18a, 19a of gear housings 10a, 12a, and at least partly in at least one bulge region 20a, 22b. In addition, bracket unit 14a, in particular holding elements 40a, 42a, is situated at least partly in an axial segment of second ring gear bearing region 24a, of third ring gear bearing region 26a, of securing bearing region 32a, and of bearing region 34a of locking element 36a. In addition, bracket unit 14a, in particular holding elements 40a, 42a, is situated in an axial segment of supporting unit 98a. In addition, bracket unit 14a, in particular holding elements 40a, 42a, is situated axially between gearshift unit 60a and adjusting unit 66a.

The handheld tool device additionally includes a supporting unit 98a. Supporting unit 98a includes securing ring 78a and/or locking element 36a, the bayonet connection, and a plurality of openings 100a of second gear housing 12a. Supporting unit 98a is provided to absorb the axial force occurring during operation in order to relieve stress on bracket holder unit 14a. In the present case, supporting unit 98a is provided to absorb an axial force of third ring gear 30a. For this purpose, securing ring 78a and/or locking element 36a is supported immediately on second gear housing 12a and indirectly on first gear housing 10a. In this way, a material thickness of the at least one holding element 40a, 42a can advantageously be kept small. Alternatively, however, it is also conceivable that a bracket holder unit of a pure transport securing unit is fashioned differently, and in particular is also provided during operation to absorb a large part of the occurrent forces. For further details relating to the realization of supporting unit 98a, of securing ring 78a, and/or of locking element 36a, reference is made to DE 10 2011 081 661 A1, whose disclosure is here explicitly referred to.

Figure 6:
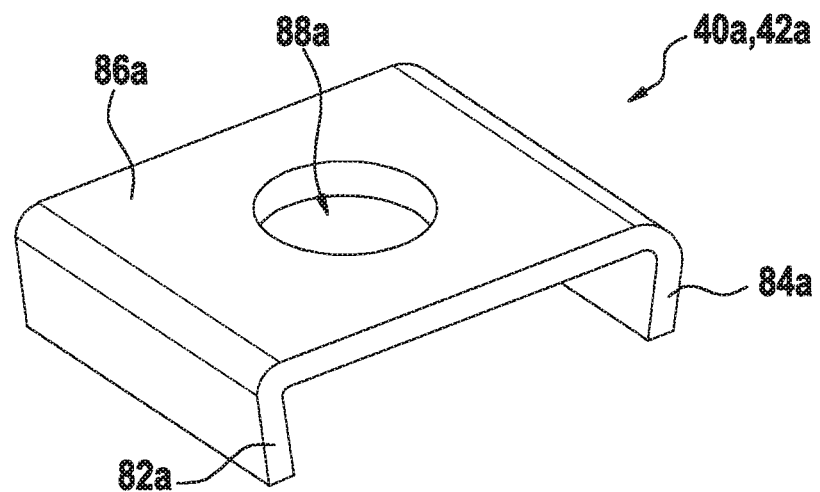
FIG. 6 shows a holding element of the bracket holder unit in an enlarged view.
Figure 7:
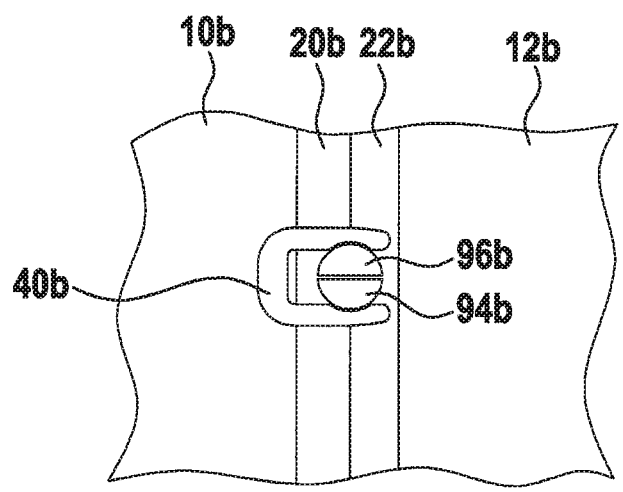
FIG. 7 shows a gear housing unit and a bracket holder unit of a further handheld tool device, in a schematic top view.
Figure 8:
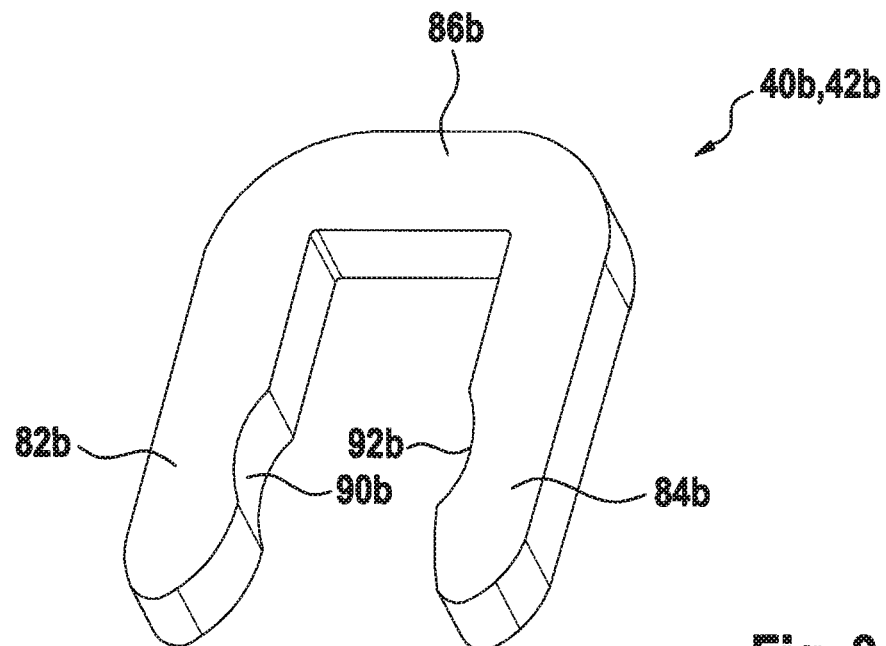
FIG. 8 shows a holding element of the bracket holder unit of FIG. 7 in an enlarged representation.
Figure 9:
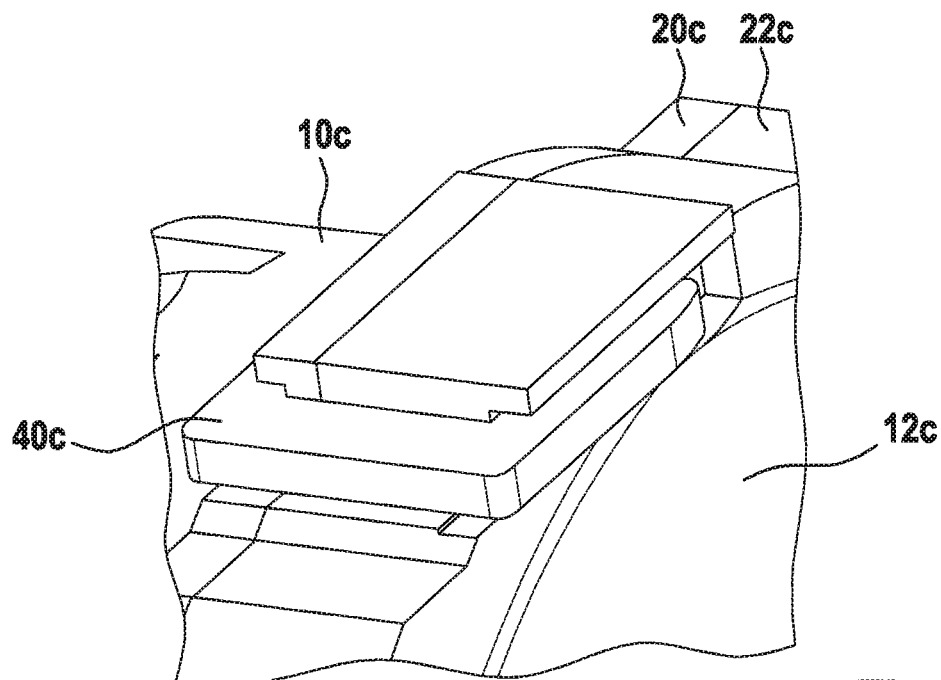
FIG. 9 shows a gear housing unit and a bracket holder unit of a further handheld tool device in a perspective view.

FIGS. 6 through 8 show a further exemplary embodiment of the present invention. The following descriptions and the drawings are limited substantially to the differences between the exemplary embodiments, and, with regard to components having identical designations, in particular with regard to components having identical reference characters, reference is fundamentally also made to the drawings and/or to the description of the other exemplary embodiments, in particular of FIGS. 1 through 5. In order to distinguish the exemplary embodiments, the letter 'a' has been appended to the reference characters of the exemplary embodiment in FIGS. 1 through 5. In the exemplary embodiments of FIGS. 6 through 8, the letter 'a' is replaced by the letters 'b' and 'c.'

In FIGS. 6 and 7, a first exemplary embodiment of the present invention is shown. The letter 'b' is appended to the exemplary embodiment of FIGS. 6 and 7. The further exemplary embodiment differs from the preceding exemplary embodiment at least substantially by a holding element 40b, 42b of a bracket unit 14b.

In the present case, holding elements 40b, 42b are provided for axial assembly and/or disassembly. In addition, holding arms 82b, 84b of holding elements 40b, 42b each have an additional locking opening 90b, 92b. Locking openings 90b, 92b are provided to accept, in an assembled state, corresponding locking projections 94b, 96b of a first gear housing 10b and/or of a second gear housing 12b.

FIG. 8 shows a further exemplary embodiment of the present invention. The letter 'c' is appended to the exemplary embodiment of FIG. 8. The further exemplary embodiment differs from the preceding exemplary embodiment at least substantially by a fastening direction of a holding element 40c, 42c of a bracket unit 14c.

Holding elements 40c, 42c correspond to holding elements 40b, 42c of the preceding exemplary embodiment. However, in the present case holding elements 40c, 42c are provided for a tangential assembly and/or disassembly.

What is claimed is:

1. A handheld tool device, comprising:
   at least one first gear housing having a first bulge region, the first bulge region being embodied in one piece with the at least one first gear housing;
   at least one second gear housing having a second bulge region, the second bulge region being embodied in one piece with the at least one second gear housing; and
   a bracket holder unit to connect the at least one first gear housing to the at least one second gear housing, the bracket holder unit being separate from the at least one first gear housing and the at least one second gear housing,
   wherein, in an assembled state, the bracket holder unit is situated at least in an area of contact of the first bulge region of the at least one first gear housing and the second bulge region of the at least one second gear housing,
   wherein the bracket holder unit includes at least one holding element having two holding arms and a connecting web connecting the two holding arms, and
   wherein the at least one holding element is configured to embrace the at least one first gear housing and the at least one second gear housing such that respective ones of the two holding arms engage with the first bulge region of the at least one first gear housing and the second bulge region of the at least one second gear housing to exert an axial holding force on the at least one first gear housing and the at least one second gear housing.

2. The handheld tool device of claim 1, wherein the bracket holder unit is situated at least partially in a radial recess of at least one of the first gear housing and the second gear housing.

3. The handheld tool device of claim 1, wherein the bracket holder unit is situated at least partially in an axial recess of at least one of the first gear housing and the second gear housing.

4. The handheld tool device of claim 1, wherein the bracket holder unit is configured for a tangential assembly and/or a tangential disassembly.

5. The handheld tool device of claim 1, wherein the bracket holder unit has an axial extension less than 30 mm.

6. The handheld tool device of claim 1, wherein at least one of the first gear housing and the second gear housing has a ring gear bearing region in whose axial segment the bracket holder unit is at least partially situated.

7. The handheld tool device of claim 6, wherein the ring gear bearing region is configured for accommodating a ring gear of a gear shift and/or for accommodating a ring gear of a torque coupling.

8. The handheld tool device of claim 1, wherein at least one of the first gear housing and the second gear housing has a securing bearing region in whose axial segment the bracket holder unit is at least partially situated.

9. The handheld tool device of claim 1, wherein at least one of the first gear housing and the second gear housing has a bearing region of a locking element for a housing-fixed locking of a gear shift element, the bracket holder unit being situated at least partially in the axial segment of the bearing region.

10. The handheld tool device of claim 1, further comprising:
    a supporting unit to absorb, at least in large part, at least one axial force occurring during operation inside at least one of the first gear housing and the second gear housing to relieve stress on the bracket holder unit.

11. The handheld tool device of claim 1, wherein at least one of the first gear housing and the second gear housing is to accommodate an at least two-speed planetary gear.

12. The handheld tool device of claim 1, wherein the bracket holder unit has at least two holding elements fashioned separately from one another, which are provided to exert axial holding forces on the first gear housing and the second gear housing.

13. The handheld tool device of claim 12, wherein, in the assembled state, the at least two holding elements are situated radially opposite one another.

14. The handheld tool device of claim 1, wherein the bracket holder unit is situated at least partially in a recess of at least one of the first bulge region of the first gear housing and the second bulge region of the second gear housing.

15. The handheld tool device of claim 1, wherein the connecting web of the at least one holding element includes a through-opening.

16. The handheld tool device of claim 1, wherein each of the two holding arms includes a locking opening configured to accept, in the assembled state, corresponding locking projections of the at least one first gear housing and the at least one second gear housing.

17. The handheld tool device of claim 1, wherein the bracket holder unit is situated axially between a gearshift unit configured to shift between at least two gear speeds and an adjusting unit configured to manually adjust a torque.

18. A handheld machine tool, comprising:
at least one handheld tool device, including:
at least one first gear housing having a first bulge region, the first bulge region being embodied in one piece with the at least one first gear housing;
at least one second gear housing having a second bulge region, the second bulge region being embodied in one piece with the at least one second gear housing; and
a bracket holder unit to connect the at least one first gear housing to the at least one second gear housing, the bracket holder unit being separate from the at least one first gear housing and the at least one second gear housing,
wherein, in an assembled state, the bracket holder unit is situated at least in an area of contact of the first bulge region of the at least one first gear housing and the second bulge region of the at least one second gear housing,
wherein the bracket holder unit includes at least one holding element having two holding arms and a connecting web connecting the two holding arms, and
wherein the at least one holding element is configured to embrace the at least one first gear housing and the at least one second gear housing such that respective ones of the two holding arms engage with the first bulge region of the at least one first gear housing and the second bulge region of the at least one second gear housing to exert an axial holding force on the at least one first gear housing and the at least one second gear housing.

* * * * *